Oct. 15, 1974

P. D. J. DICKS ET AL 3,841,935

METHOD FOR FORMING A LAMINATE

Filed July 14, 1972

United States Patent Office 3,841,935
Patented Oct. 15, 1974

3,841,935
METHOD FOR FORMING A LAMINATE
Peter D. J. Dicks, Kitchener, Ontario, and William M. Hill, Ayr, Ontario, Canada, assignors to Spraymould (Bahamas) Limited, Nassau, Bahamas
Filed July 14, 1972, Ser. No. 271,903
Int. Cl. B31f 1/28
U.S. Cl. 156—210                                   3 Claims

ABSTRACT OF THE DISCLOSURE

A method and apparatus for forming a laminate which consists of at least two elements each having a laminating surface and at least one of the laminating surfaces being formed from a substantially stress free plastics material by electrostatically molding powdered plastics material thereon and fusing the molded plastics material by the application of heat. The method and apparatus is particularly suitable for use in the production of plastic laminates such as corrugated sheets wherein the facing sheets and corrugated medium are formed by electrostatic deposition of plastic material on rotary molding drums. The laminating surface of the first web being placed in a face to face contact with the crests of the corrugated medium so that one web is bonded to the corrugated medium and thereafter a second web may be placed in contact with the other face of the corrugated medium to form a double-faced corrugated plastic sheet. The apparatus consists of at least two rotary molding drums, each having a molding surface and guide means for guiding the web formed on one drum into a face to face contact with the web formed on the other drum. In the manufacture of a corrugated plastic laminate, one of the molding drums is formed with a molding surface having a plurality of transversely extending crests and valleys.

FIELD OF INVENTION

This invention relates to the manufacture of laminates bonded to one another by laminating surfaces formed from plastics material. In particular, this invention relates to a method of manufacturing a laminate such as a corrugated laminate wherein the laminating surfaces are formed from a substantially stress-free plastics material by electrostatically molding powdered plastics material to form the laminated surfaces.

PRIOR ART

Numerous attempts have been made to form laminates from webs which have laminating surfaces formed from plastics material. Considerable difficulty has been experienced in obtaining a satisfactory bond between the laminating surfaces because the preformed webs of plastics material are subjected to considerable stresses in their formation and when these stresses are released by heating and subsequently cooling the plastics material in the formation of the laminate, the plastics coated surfaces tend to pull away from one another. This problem is particularly acute in attempting to form a bond between a corrugated medium and a liner wherein the area of contact at the crests of the corrugated medium and the liner is very small.

SUMMARY

The present invention overcomes the difficulties of the prior art described above by providing a method of forming a laminate wherein the laminating surfaces of the webs are formed from a substantially stress-free plastics material.

According to an embodiment of the present invention, an improvement is provided in the method of manufacturing a laminate which consists of at least two elements each having a laminating surface and wherein the laminating surfaces are bonded to one another while heated. The improvement of the present invention consists of forming at least one of the laminating surfaces from a substantially stress-free plastics material by electrostatically molding powdered plastics material and fusing said molded plastics material by the application of heat to form said one laminating surface.

According to a further embodiment of the present invention, a method of forming a laminate consisting of at least two webs of plastics material comprises the steps of, preforming a first web and forming a second web by applying an electrically charged powdered plastics material to a mold, heating the powdered plastics material to fuse said powdered plastics material to form a continuous web on the mold, the molded web having an exposed laminating surface maintained at a bonding temperature, placing the laminating surfaces in engagement with one another and cooling the webs while maintaining the laminating surfaces in engagement with one another to bond the laminating surfaces to one another and thereby form said laminate.

According to a still further embodiment of the present invention, a method of forming a laminate as defined above is employed in the manufacture of a laminate consisting of a corrugated medium and a liner which are bonded by means of a substantially stress-free plastics material which forms the laminating surfaces thereof.

The present invention also provides an apparatus for forming a laminate which includes at least one rotatably driven electrostatic molding drum and means for applying a coating of electrostatically charged powdered plastics material to the drum in a charging station. The drum is also provided with a heating zone for heating the plastics material to a temperature at which the material fuses to form a continuous web and a cooling zone for cooling the fused web. The apparatus also includes pressure roll means adjacent the discharge end of the heating zone for pressing a preformed web into engagement with the web formed on said drum so as to form a laminate.

PREFERRED EMBODIMENT

The invention will be more clearly understood after reference to the following detailed specification read in conjunction with the drawings, wherein, FIG. 1 is a diagrammatic illustration of an apparatus for forming double faced corrugated plastics material according to an embodiment of the present invention;

Figure 1:
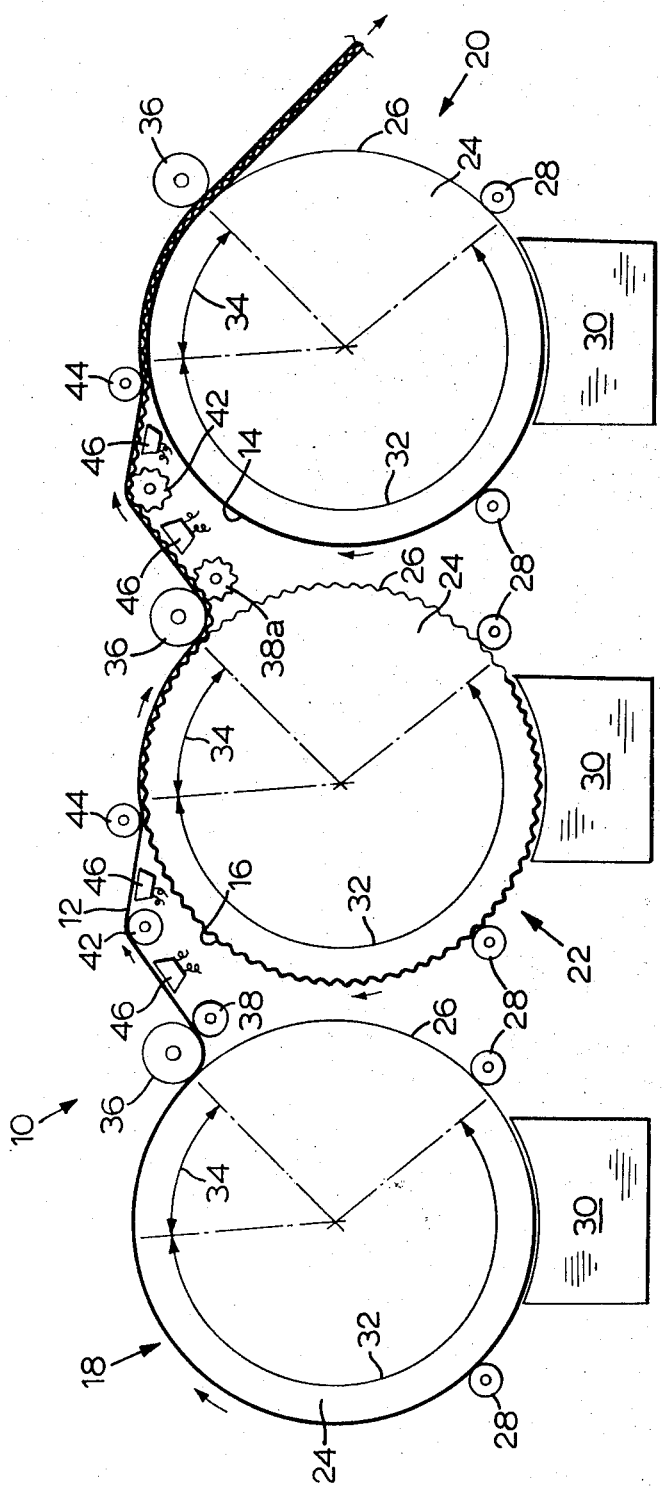

With reference to FIG. 1 of the drawings, the reference numeral 10 refers generally to an apparatus for manufacturing a laminate according to an embodiment of the present invention. The apparatus which is diagrammatically illustrated in FIG. 1 of the drawings is adapted to form a double-faced corrugated laminate of the type illustrated in FIG. 2 of the drawings. The corrugated laminate consists of a pair of facing sheets 12 and 14 connected to one another by means of a corrugated medium 16. The facing sheets 12 and 14, together with the corrugated medium 16, are made from a plastic material.

With reference to FIG. 1 of the drawings, the reference numerals 18 and 20 refer generally to a pair of rotary molds that tend to form the facing sheets 12 and 14 respectively, and the reference numeral 22 refers generally to a rotary mold adapted to form the corrugated medium 16. Each of the rotary molds includes a rotary drum member 24, which has a molding surface 26. The molding surface 26 of the rotary molds 18 and 20 is generally planar, while the molding surface 26 of the rotary mold 22 is formed with a plurality of corrugations which correspond to the required contour of the corrugated medium. The molding drums 24 are rotatably driven on support rollers 28 so that the molding surfaces 26 are located in close proximity to an electrostatic fluidized bed 30 adjacent the lower end thereof. The drums 24 are rotatably driven by a suitable drive motor 40. The interior of the rotary drums 24 is divided into a heating zone 32 and an adjustable cooling zone 34. In the heating zone the molding surface is heated by the direct application of heated spray fluid to the inner face of the drum, and in the cooling zone the mold is cooled by the direct application of a cooling fluid to the inner face of the molding drum, as will be described hereinafter with reference to FIGS. 3 and 4 of the drawings.

The apparatus of FIG. 1 also includes rollers 36, 38, 38A and 42, which serve to grind the web in its passage between the drums and at discharge from the drums. Laminating rollers 44 are also provided to apply pressure to the webs during lamination. In addition heating filaments 46 are positioned in a face to face relationship with respect to the surfaces which are to be laminated so as to maintain the surface temperatures at a suitable temperature for laminating.

The method according to the present invention can be clearly understood with reference to FIG. 1 of the drawings. The molding surface 26 of each drum is rotated in close proximity to its electrostatic fluidized bed, and electrostatically charged particles of plastic material are continuously deposited on to the molding surface 26. The molding surface is heated prior to entry into the station at which the plastic is deposited thereon by the fluidized bed and continuous through the heating zone for a sufficient period of time to cause the plastic material to become fused into a continuous web. The molding surface then passes into the cooling zone in which the molded plastic material is cooled to a sufficient extent to enable it to be removed in the form of a continuous web from the molding drum. As previously indicated, the webs formed in the rotary molds 18 and 20 are substantially planar, while the web formed in the rotary mold 22 is corrugated. The plain web 12 formed by the rotary mold 18 is lifted off the molding surface, passed through rollers 36, and 38 over the element 46, roller 42 and second heating element 46 and brought into engagement with the corrugated web formed on the rotary mold 22 by passing between the roller 44 and the molding surface 26 of the drum 24. The heating elements 46 serve to maintain the temperature of the surface of the web 12 which is to be laminated with the crests of the corrugated medium 16 at an elevated bonding temperature. The roller 44 has a plain surface and its position relative to the molding surface 26 of the drum 24 may be adjusted so that the pressure applied by the roller may be adjusted in order to achieve the required bond between the web 12 and the medium 16. Similarly the circumferential position of the roller 44 may be adjusted. The corrugated medium 16 is formed in the same manner as the facing sheet 12 in that the powdered plastic is applied to the molding surface by an electrostatic fludized bed and the plastic is heated in the heating zone. The corrugated medium 16 and the facing sheet 12 pass from the roller 44 into the cooling zone 34 of the mold 22 and are maintained in a face to face relationship until the material is sufficiently cool to be removed from the drum with the bond formed between the facing sheet 12 and the corrugated medium 16 being permanently set. The laminate is then removed from the mold 22 between rollers 36 and 38A. At this stage of the process a single faced corrugated sheet has been formed, and if this end product is required, the material being discharged from the rotary mold 22 may be coiled for shipping.

If a double faced corrugated material is required, the rotary mold 20 is activated so as to form the planar facing sheet 14. The rotary mold 20 may be the same as the rotary mold 18 and the facing sheet 14 is the same as the facing sheet 12 and is produced in the same manner.

It will be noted that the surface of the roller 38A is corrugated to match the corrugations of the medium 16 so that the corrugations of the medium 16 are not deformed as a result of the passage of the laminate between the nip of the rollers 36 and 38A. The surface of the laminate which is to be bonded to the second facing sheet 14 is again maintained at the required bonding temperature by means of radiant heaters 46. The crests of the corrugated medium 16 are brought into contact with the inner surface of the facing sheet 14 between the laminating roller 44 and the molding surface 26 of the drum 24, and shortly thereafter the corrugated sheet, which includes the facing sheet 12, the corrugated medium 16 and the facing sheet 14, pass to the cooling zone 34 of the molding device 20. The laminate is cooled to a sufficient extent to permanently set the bond between the crests of the corrugated medium 16 and the facing sheet 14. The laminate is then removed from the molding drum device 20 after passing the roller 26.

It is important to note that in passing between and over the various guide rollers the molded webs are not subjected to any significant pressures capable of establishing any substantial stress within the body of the laminate so that when the webs are brought into the face to face position for laminating, they are substantially stress free. It will also be noted that in each laminating step at least one of the webs is being laminted immediately after it has been formed and prior to its first cooling, with the result that at least one of the webs is substantially totally stress free when compared with webs which are formed in the conventional manner by extrusion, drawing, rolling or the like. The fact that all of the webs formed in the present invention are substantially stress free prior to the laminating of the webs is extremely important as it has been found that when the bonded webs are cooled they do not tend to pull away from one another to any significant extent, with the result that a substantially stress free bond is established.

Figure 2:
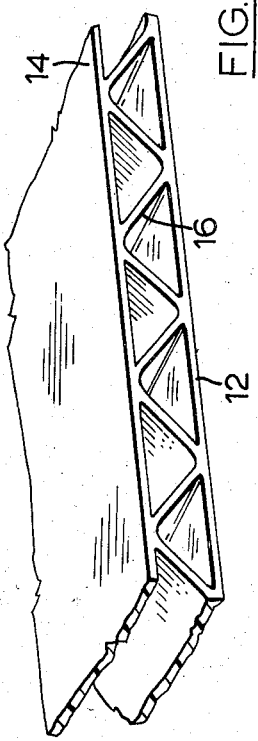
FIG. 2 is a cross-sectional view of a portion of double faced corrugated plastics material.

It will be understood that while in the embodiment of the invention illustrated in FIGS. 1 and 2 of the drawings, the laminate is in the form of a corrugated medium bonded to one or two facing sheets, the present invention may be employed in the formation of a laminate of two or more generally planar sheets, such as the facing sheets 12 and 14 which may be bonded over their entire surface. The corrugated structure has been illustrated and described as the present invention has particular advantage in this field because of the fact that the limited surface contact between the corrugated medium and the facing sheets aggravates the problems resulting from the pulling away from one another of the bonded sheets resulting from the stresses in the material at formation. The invention may be used as applied to two generally planar sheets where it is desirable to provide a laminate having two plastic materials of somewhat different character and the sheets to be laminated may be of different thicknesses, the thicknesses being adjusted by the amount of plastic material deposited on the rotary drum during the molding process.

Figure 3:
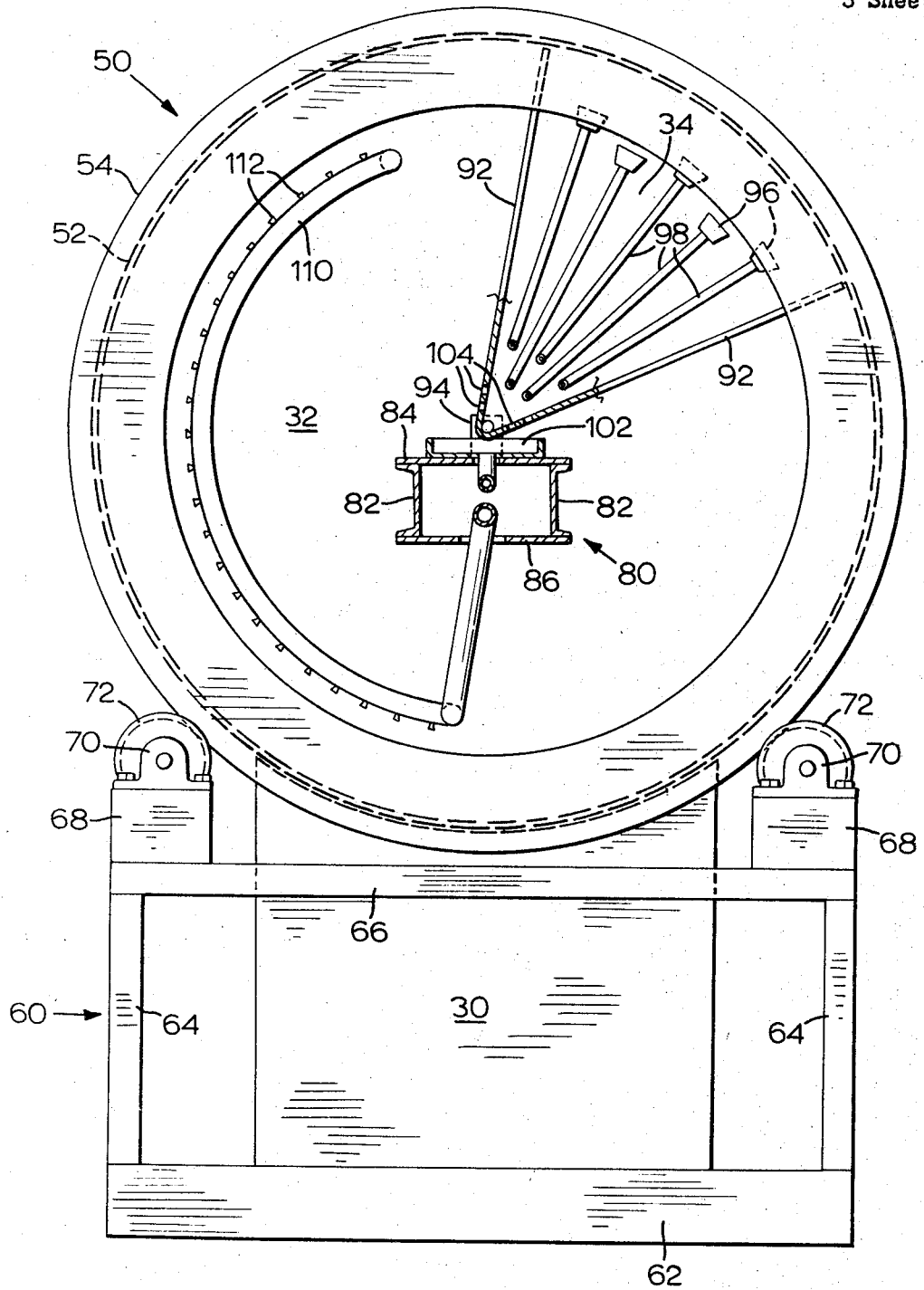
FIG. 3 is a partially sectioned front view of a rotary molding apparatus according to an embodiment of the present invention.
Figure 4:
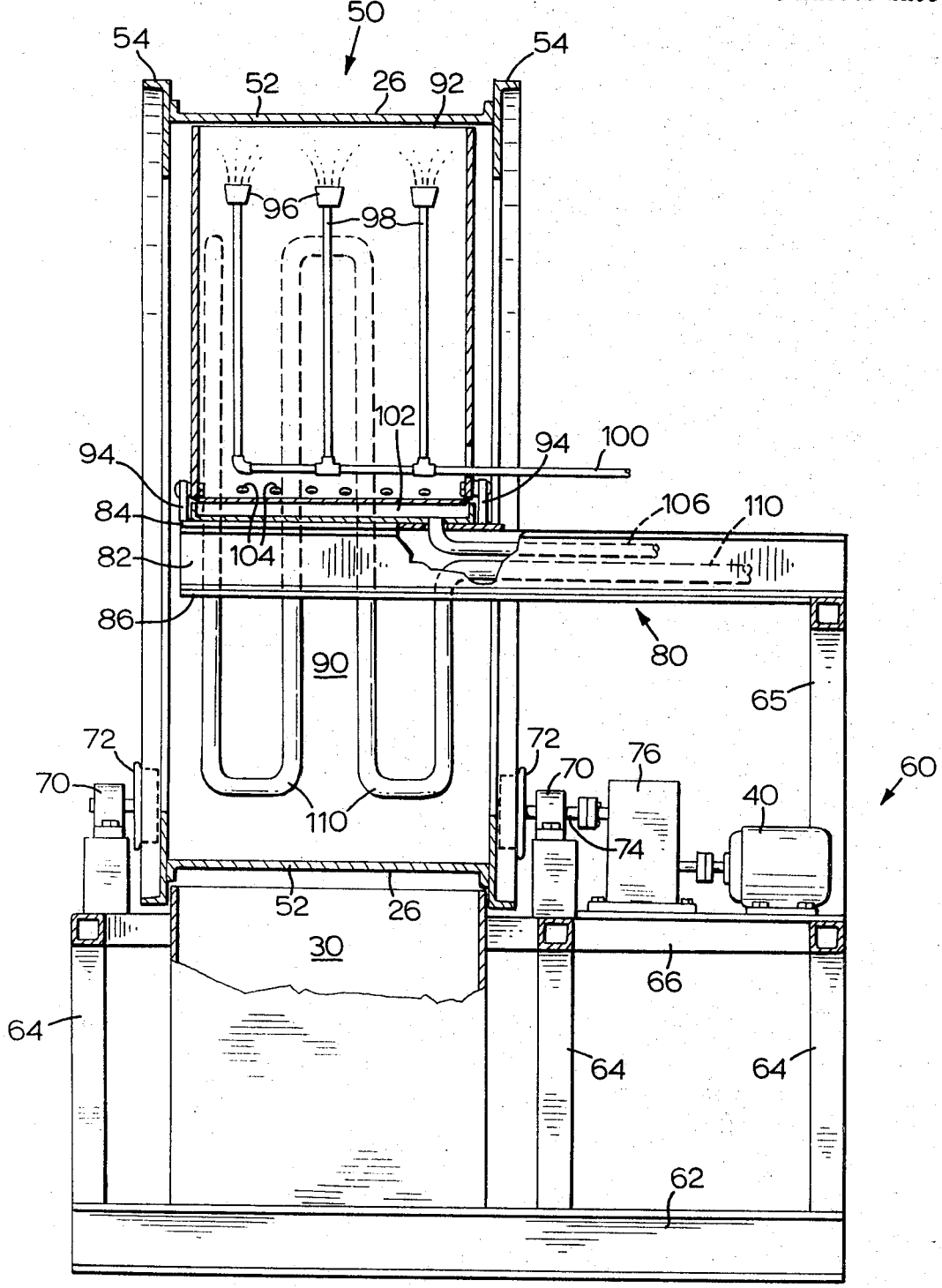
FIG. 4 is a partially sectioned side view of the molding apparatus of FIG. 3.

An apparatus suitable for use as a rotary mold is illustrated in FIGS. 3 and 4 of the drawings. The apparatus consists of a rotary drum 50 which has a pair of end face plates 54, which support a cylindrical shaped drum 52. The molding surface 26 is formed on the exterior of the cylindrical drum 52. The drum 54 is supported by a frame, generally identified by the reference numeral 60, which consists of base members 62, vertical posts 64 and transverse support beams 66, which are mounted at the upper end of the posts 64. Support blocks 68 support four bearing housings 70 in which four rollers 72 are mounted. The rollers 72 support the peripheral edges of the face plates 54 and, as shown in FIG. 4 of the drawings, at least one of the rollers 72 is rotatably driven by a motor 40 through a reduction gear box 76 and a drive shaft 74.

A platform 80 is formed from a pair of channel shaped members 82 connected at their upper edges by a plate 84 and at their lower edges by a plate 86. The platform 80 is mounted at its outer end on the upper end of a support pillar 65 and extends into the chamber 90 formed within the rotary drum. The interior of the chamber 90 is divided into the heating zone 32 and a cooling zone 34 by means of plates 92 which extend across the width of the drum and are pivotally mounted at their inner ends on support brackets 94 carried by the platform 80. A plurality of spray heads 96 are mounted on the inner ends of conduits 98 in close proximity to the surface of the molding drum so as to direct cooling fluid against the inner surface of the molding surfaces. The conduits 98 are supplied with a cooling fluid by way of conduit 100. The cooling liquid drains from the cooling station into a receptacle 102 formed in the upper face of the plate 84 through passages 104 in the plates 92. Cooling fluid is then discharged through conduit 106.

The heating zone is heated by a conduit 110 which extends into the heating zone and is formed with a plurality of discharge orifices 112, which are directed toward the inner face of the molding surface. The heating fluid gathers in the lower end of the rotary drum and is removed for recirculation by means of a simple sump pump (not shown).

The heating fluid may be a sodium nitrite/sodium nitrate solution such as that sold under the trademark Hytec by Du Pont of Canada Limited and the cooling fluid may be water.

The plastic material used in the manufacture of the webs may be any of the well know plastic materials which are capable of being formed by an electrostatic molding process such as polyethylene, polypropylene and polyvinylchloride.

The rotary mold described above may also be a modified version of the molding machine described in detail in our U.S. Pat. No. 3,369,274. This mold may be modified by replacing the molding elements 28 by a molding surface having the contour required for the production of either a planar facing sheet or a corrugated medium as described above. The spray molding apparatus of our prior patent may also be used in place of the fluidized bed described above. The heating and cooling systems described in our prior U.S. patent may also be substituted for those described in the present application. However, there is advantage to the cooling apparatus of the present invention, in that it is angularly adjustable so that the degree of cooling may be adjusted by adjusting the angular position of the cooling zone relative to the drum.

From the foregoing it will be apparent that the present invention provides an improved method and apparatus for the production of plastic laminates in which substantially stress free plastic materials are laminated thereby ensuring a satisfactory bond.

The embodiments of the invention in which an exclusive property or privilege is claimed are defined as follows:

1. A method of forming a laminate consisting of at least two webs of plastics material comprising the steps of
   (a) forming a first web having a first laminating surface by applying an electrically charged powdered plastics material to a mold and heating the powdered plastics material to fuse the powdered plastics material to form a continuous web on the mold,
   (b) forming a second web having a second laminating surface by applying an electrically charged powdered plastics material to a mold, heating the powdered plastics material to fuse the powdered plastics material to form a continuous web on the mold, and
   (c) placing said laminating surfaces in engagement with one another and cooling the webs while maintaining the laminating surfaces in engagement with one another to bond the laminating surfaces to one another and thereby form said laminate.

2. A method of forming a laminate as claimed in Claim 1 wherein one of said webs is formed on a mold which has a molding surface formed with a plurality of transverse corrugations whereby the web formed on the corrugated mold is in the form of a corrugated medium, the other web being substantially planar so as to form a planar liner such that when the two webs are bonded together, a substantially stress-free single-faced corrugated laminate is provided.

3. A method of forming a double-faced corrugated laminate comprising the steps of
   (a) forming a first web having a substantially planar laminating surface of a substantially stress-free plastics material by electrostatically molding powdered plastics material on a rotary molding drum and fusing the molded plastics material by the application of heat,
   (b) forming a corrugated web having a pair of oppositely disposed laminating surfaces of a subtantialy stress-free plastics material by electrostatically molding powdered plastics material on a molding drum having a corrugated molding surface and fusing the molded plastics material by application of heat, placing said laminating surface on said first web in engagement with the crests of a first laminating surface of said corrugated web while said laminating surfaces are at a bonding temperature and cooling said webs while maintaining the laminating surfaces in engagement with one another to bond the laminating surfaces to one another and thereby form a single-faced corrugated laminate, and
   (c) forming a third web of plastics material having a substantially planar bonding surface of a substantially stress-free plastics material by electrostatically molding powdered plastics material and fusing said molded plastics material by the application of heat and placing the laminating surface of said second planar web in engagement with the crests of the other laminating surface of said corrugated web while the laminating surfaces are at a bonding temperature and cooling the webs while maintaining the laminating surfaces in engagement with one another to bond the laminated surfaces to one another and thereby form a double-faced corrugated laminate.

References Cited
UNITED STATES PATENTS

| | | | |
|---|---|---|---|
| 3,701,700 | 10/1972 | Von Der Heide | 156—210 |
| 3,432,372 | 3/1969 | Avot | 156—205 |
| 3,278,656 | 10/1966 | Dicks et al. | 264—22 |
| 3,369,274 | 2/1968 | Dicks et al. | 264—22 |
| 3,660,547 | 5/1972 | Ruekberg | 264—24 |

DOUGLAS J. DRUMMON, Primary Examiner

C. WESTON, Assistant Examiner

U.S. Cl. X.R.

156—242, 245, 272; 264—26, 299